United States Patent
Benvenuto et al.

(10) Patent No.: US 7,869,497 B2
(45) Date of Patent: Jan. 11, 2011

(54) FREQUENCY-DOMAIN DECISION FEEDBACK EQUALIZING DEVICE AND METHOD

(75) Inventors: Nevio Benvenuto, Mogliano Veneto (IT); Stefano Tomasin, Venice (IT); Luigi Agarossi, Concorezzo (IT)

(73) Assignee: NXP B.V., Eindhoven (NL)

( * ) Notice: Subject to any disclaimer, the term of this patent is extended or adjusted under 35 U.S.C. 154(b) by 1235 days.

(21) Appl. No.: 10/525,597

(22) PCT Filed: Jul. 31, 2003

(86) PCT No.: PCT/IB03/03839

§ 371 (c)(1),
(2), (4) Date: Feb. 25, 2005

(87) PCT Pub. No.: WO2004/021657

PCT Pub. Date: Mar. 11, 2004

(65) Prior Publication Data

US 2005/0259727 A1  Nov. 24, 2005

(30) Foreign Application Priority Data

Aug. 30, 2002 (EP) .................................. 02078603

(51) Int. Cl.
H03H 7/30 (2006.01)
(52) U.S. Cl. ...................................... 375/233; 375/222
(58) Field of Classification Search .................. 375/233
See application file for complete search history.

(56) References Cited

U.S. PATENT DOCUMENTS

| | | | | |
|---|---|---|---|---|
| 4,893,316 A | * | 1/1990 | Janc et al. ................... 708/300 |
| 5,020,078 A | * | 5/1991 | Crespo ....................... 375/233 |
| 5,031,194 A | * | 7/1991 | Crespo et al. ................ 375/233 |
| 5,345,476 A | * | 9/1994 | Tsujimoto .................... 375/233 |
| 5,479,168 A | * | 12/1995 | Johnson et al. .............. 341/110 |
| 5,808,574 A | * | 9/1998 | Johnson et al. .............. 341/110 |
| 6,052,702 A | | 4/2000 | Berberidis et al. |
| 6,115,418 A | * | 9/2000 | Raghavan .................... 375/233 |
| 6,148,024 A | | 11/2000 | Ho et al. |

(Continued)

FOREIGN PATENT DOCUMENTS

EP  1 139 621  10/2001

(Continued)

OTHER PUBLICATIONS

Benvenuto N et al. "Block Iterative DFE for Single Carrier Modulation" Electronics Letters, IEE Stevenage, GB, vol. 38, No. 19, Sep. 12, 2002.

(Continued)

*Primary Examiner*—Shuwang Liu
*Assistant Examiner*—Michael R Neff

(57) ABSTRACT

A fast Fourier transformation is performed on a first vector of signals, and as a result a second vector of signals is provided. A feed forward equalization is performed by multiplying each of the components of said second vector with equalization parameters, and as a result a third vector of signals is provided. An inverse fast Fourier transformation is performed on said third vector, and as a result a fourth vector of signals is provided. An output signal of said first section is provided on the basis of said fourth vector of signals. In a second section a signal derived from an output signal of said second section is is filtered via linear feedback filtering and the filtered signal is added to said first section output signal, and an added signal is provided, and said second section output signal is generated by extracting samples from said added signal.

28 Claims, 2 Drawing Sheets

U.S. PATENT DOCUMENTS

Figure 1:
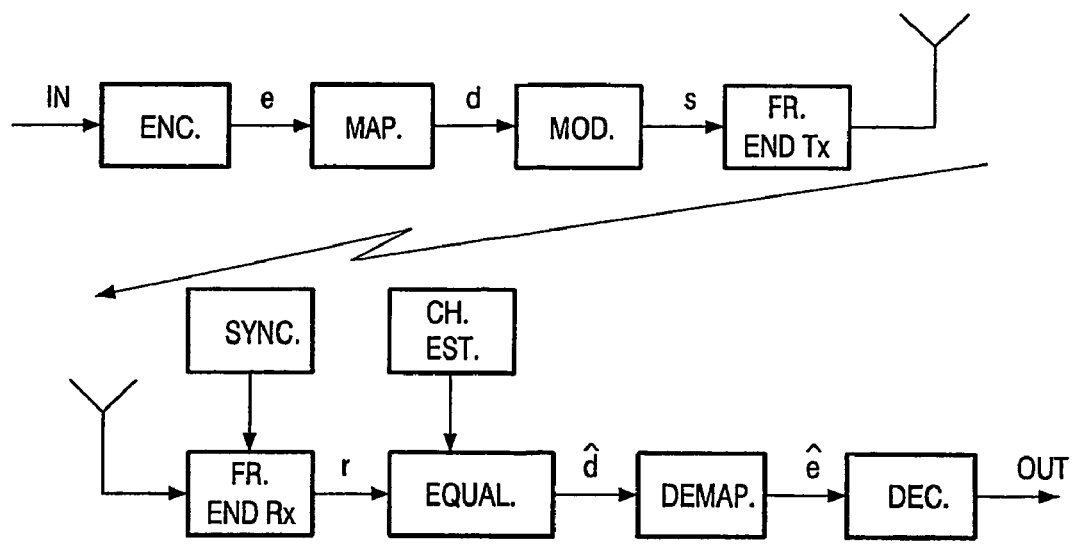

| | | |
|---|---|---|
| 6,219,378 B1 | 4/2001 | Wu |
| 6,693,958 B1 | 2/2004 | Wang et al. |
| 2002/0037058 A1* | 3/2002 | Birru .................. 375/340 |
| 2002/0070796 A1 | 6/2002 | Gay-Bellile et al. |
| 2003/0016770 A1* | 1/2003 | Trans et al. ............ 375/346 |
| 2004/0013084 A1* | 1/2004 | Thomas et al. .......... 370/210 |

FOREIGN PATENT DOCUMENTS

| | | |
|---|---|---|
| EP | 1 202 509 A1 | 5/2002 |
| JP | 2000-228641 | 8/2000 |
| JP | 2002-077003 | 3/2002 |
| WO | 01/20919 A1 | 3/2001 |
| WO | 01/35561 A1 | 5/2001 |
| WO | 02/059835 A1 | 8/2002 |

OTHER PUBLICATIONS

Sari, H. et al. "Transmission Techniques for Digital Terrestrial TV Broadcasting", IEEE Communications Magazine, vol. 33, No. 2, pp. 100-109 (Feb. 1995).

Olukayode, A. et al. "An Algorithm for Integrated Noise Reduction and Sharpness Enhancement", IEEE. Trans. On Consumer Electronics, vol. 46, No. 3, pp. 474-480 (Aug. 2000).

* cited by examiner

FREQUENCY-DOMAIN DECISION FEEDBACK EQUALIZING DEVICE AND METHOD

The present invention relates to a frequency-domain decision feedback equalizer device for single carrier modulation, preferably for use in a broadband communication system. Further, the present invention relates to a receiver and a transmitter of a communication system using a single carrier modulation as well as to a communication system including such a transmitter and such a receiver. Moreover, the present invention relates to a frequency-domain decision feedback equalizing method for single carrier modulation, preferably for use in a broadband communication system. Finally, the present invention relates to a method for transmitting data using a single carrier modulation.

Such apparatuses, method and system are preferably used in wired and wireless transmission systems like xDSL, DAB and DVB.

U.S. Pat. No. 6,052,702 A discloses a decision feedback filter device comprising a forward filter and a feedback filter for the production, from input symbols, of the corresponding decisions. The forward filter (FF) receives the input symbols and the feedback filter receives the decisions. The forward filter carries out a frequency domain filtering of blocks of M input symbols, and the feedback filter carries out a frequency domain filtering of blocks of L decisions, with L being lower than M. The feedback filter permits the intersymbol interference caused by the reception of echoes to be rectified.

U.S. Pat. No. 6,148,024 A describes a system and a method for transmitting coded information bits using multitone techniques on a frame-by-frame basis. For transmission, coded information bits are mapped into differential phase signals and absolute phase signals are generated based on differential phase signals. N complex symbols are then generated and inverse discrete Fourier transformed into N complex, time-domain samples, which are augmented with a cyclic prefix and suffix. The augmented N complex, time-domain samples are then separated into two real samples and converted into first and second baseband signals. The first and second baseband signals are impressed into quadrature carrier components to form in-phase and quadrature signal components which are combined into an RF signal prior to transmission. For reception, a received RF signal is non-coherently quadrature demodulated into first and second quadrature baseband signals. First and second quadrature sample sequences are generated by sampling the quadrature baseband signals in parallel. The added cyclic prefix and suffix are discarded, and N complex numbers are generated from the first and second quadrature (real) sample sequences. N channel-weighted tones are generated by performing a discrete Fourier transform on the N complex numbers. N phase difference signals are generated which are demapped into coded information bits according to a predetermined phase constellation.

WO 01/35561 A1, describes a multicarrier digital transmission system, wherein an emitter converts a serial input data stream into a set of parallel substreams and an OQAM modulator receives and supplies each substream to an input of a synthesis filter bank. Synchronization input(s) of the filter bank receive an OQAM signal that carries a data sequence. This sequence contains frame, superframe and hyperframe synchronization patterns, and specifies the number of bits allocated to each subchannel. A receiver includes an analysis filter bank that decomposes the multicarrier signal into a set of elementary signals for each subchannel. A synchronizing processing block receives output(s) of the filter bank for synchronization subchannel(s). The block includes a first cascade of blocks that control receiver sampling times, and a second cascade of blocks that extract synchronization patterns and subchannel bit assignment data. Other filter bank outputs are each coupled to a cascade subchannel equalizer followed by a data extractor and a parallel-to-serial converter.

U.S. Pat. No. 2001/0026578 A1 discloses a code division multiple access (CDMA) transmitter and receiver having a transmission assembly including a serial-to-parallel converter for converting transmission data into a modulation input wave composed of real and imaginary parts of a complex number, a pseudo random noise (PN) generator for generating real and imaginary parts of a complex spread spectrum code in which real and imaginary parts are uncorrelated and random, a spread spectrum modulator for effecting modulation on the transmission data by producing complex numbers of the modulation input wave from the serial-to-parallel converter and the complex spread spectrum code from the PN generator, a vector combiner for combining real and imaginary part signals outputted from the spread spectrum modulator, a transmit filter for limiting a band of an output signal from the vector combiner. The CDMA transmitter and receiver have a reception assembly including a receive filter for limiting a band of received signal from the transmission assembly, a fractionally tap spacing equalizer for sampling the received signal at a rate which is an integral multiple of a chip rate thereof, and a waveform equalizer comprising a tranveral digital filter which uses a recursive least square adaptive algorithm for updating filer coefficients.

WO 01/20919 A1 discloses a method and apparatus for adaptively compensating for channel or system variations in which adaptive compensation is used in the receiver of a digital communication system. The transmitter of the digital communication system includes a precoder. The adaptive receiver compensation mitigates the interference not removed by the transmitter precoder. In an embodiment, the adaptive compensation can be performed using an adaptive feedforward filter and a feedback filter in the receiver. The feedback filter output is generated based on previous values of estimates of the transmitted precoded sequence. The determined value of the feedback filter coefficients can be periodically relayed to the transmitter after the value of the coefficients exceeds a predetermined threshold. Accordingly, the receiver adaptively and automatically compensates for misadjustments of the fixed transmitter precoder with respect to the actual channel at a given point in time.

Broadband communication systems are characterized by very dispersive channels. To face this phenomenon, two modulation techniques can be used, namely a single carrier (SC) modulation with broadband equalization, or a multi carrier modulation with orthogonal frequency division multiplexing (OFDM).

The advantages of single carrier modulation over OFDM are that:
- the energy of an individual bit is distributed over the whole frequency spectrum so that in dispersive channels, when no adaptive modulation is used, the performance of single carrier modulation is better than that of OFDM,
- the peak on average power ratio is lower than that of OFDM, yielding simpler power amplifier and lower power consumption,
- the single carrier modulation is less sensible as to carrier frequency offsets and non-linear distortion than OFDM, and
- the single carrier modulation has a better bandwidth efficiency, whereas OFDM requires a cyclic prefix, whereas the main disadvantages of single carrier modulation over OFDM are that:
- when adaptive modulation is used, OFDM yields better performance, in terms of bit error rate, than single carrier modulation with linear equalization, and
- linear and decision feedback equalization of single carrier modulation is rather complex, whereas for OFDM a simple equalization technique is available based on a cyclic prefix and a one-tap per sub-carrier equalizer.

It is therefore an object of the present invention to essentially overcome the above mentioned drawbacks of the single carrier modulation while essentially keeping the above mentioned advantages of a single carrier modulation, and, thus, to increase the performance of a single carrier modulation system.

In order to achieve the above and further objects, in accordance with a first aspect of the present invention, there is provided a frequency-domain decision feedback equalizer device for single carrier modulation, preferably for use in a broadband communication system, including a first section comprising:
- a fast Fourier transforming means for performing a fast Fourier transformation on a first vector of signals inputted into said first section, and outputting a second vector of signals,
- a feed forward equalization means for performing a feed forward equalization by multiplying each of the components of said second vector of signals with equalization parameters, and outputting a third vector of signals, and
- an inverse fast Fourier transforming means for performing an inverse fast Fourier transformation on said third vector of signals, and outputting a fourth vector of signals;

and a second section comprising:
- a feedback filter means for performing a linear filtering of a signal derived from an output signal of said second section,
- an adding means for adding the output signal of said feedback filter means to the output signal of said first section, and
- a detector means for receiving the output signal of said adding means and generating said output signal of said second section by extracting samples from the output signal of said adding means.

In accordance with a second aspect of the present invention, there is provided a frequency-domain decision feedback equalizing method for single carrier modulation, preferably for use in a broadband communication system, comprising the steps of: in a first section:
- performing a fast Fourier transformation on a first vector of signals inputted, and as a result providing a second vector of signals,
- performing a feed forward equalization by multiplying each of the components of said second vector of signals with equalization parameters, and as a result providing a third vector of signals,
- performing an inverse fast Fourier transformation on said third vector of signals, and as a result providing a fourth vector of signals, and
- providing an output signal of said first section on the basis of said fourth vector of signals; and in a second section:
- performing a linear feedback filtering of a signal derived from an output signal of said second section, and providing a filtered signal,
- adding said filtered signal to said output signal of said first section, and providing an added signal, and
- generating said output signal of said second section by extracting samples from said added signal.

With the present invention, a new frequency-domain decision feedback equalization for single carrier modulation is provided, which makes use of a data block transmission format similar to that of the multicarrier modulation with orthogonal frequency division multiplexing with cyclic prefix. Simulations show that the frequency-domain decision feedback equalization of the present invention yields a capacity very close to that of OFDM. When no channel loading is considered, the present invention performs closely to OFDM for the same averaged frame error in a coded transmission.

In particular, the present invention provides a suitable solution for the problem of peak on average power ratio, which problem is typical for OFDM systems with even an improved performance over conventional single carrier modulation architectures. Moreover, the new architecture according to the present invention provides a reliable communication system with a significantly lower complexity than conventional architectures. Namely, the present invention provides a physical-layer transmission architecture which ensures a reliable transmission and has a similar performance as OFDM and a significantly increased performance over conventional frequency-domain linear equalization, whereas all the advantages of single carrier modulation are essentially kept. Finally, since the present invention operates on a per-block basis, error propagation through the feedback filter means is limited to one block, which is a further important advantage over the conventional time-domain decision feedback equalization when operating at low signal-to-noise ratio (SNR) values.

Further advantageous embodiments of the above mentioned equalizing device and method are defined in the dependent claims 2 to 11 and 19 to 28.

Preferably, for the feed forward equalization, equalization parameters are generated adapted for minimizing the signal-to-noise ratio of the signal processed, particularly in the output signal of said first section. In particular, said equalization parameters are generated by taking into account a fast Fourier transformation estimation of a channel impulse response of the signal processed, preferably in the output signal of said first section.

In a further preferred embodiment, a sequence of signals inputted into said first section is serial-to-parallel converted to said first vector of signals, and said fourth vector of signals is parallel-to-serial converted to a sequence of output signals of said first section. In particular, scalar signals are processed. The signal-to-parallel converting can be provided to generate said first vector of signals including blocks of a predetermined number of consecutive samples of the signals inputted into said first section. In particular, scalar signals are outputted by said parallel-to-serial converting in the first section and said linear feedback filtering in said second section. The scalar signals may be constituted by consecutive blocks of a predetermined number of samples, each block being built with a predetermined number of samples of each block of said fourth vector of signals.

When extracting samples in said second section, discrete time signals are usually processed.

In a still further preferred embodiment of the present invention, the output signal of said second section is inputted into a feedback input generator means which provides an output signal which is built by consecutive blocks, each block including first a pseudo noise (PN) sequence and second a predetermined number (M) of samples from said output signal of said section, to said feedback filter means.

In accordance with a third aspect of the present invention, there is provided a receiver of a communication system using a single carrier modulation, which receiver includes the above described frequency-domain decision feedback equalizer device.

In accordance with a fourth aspect of the present invention there is provided a transmitter of a communication system using a single carrier modulation, for transmitting data, comprising a modulating means for organizing the data in blocks wherein each block is separated by a sequence of a predetermined signal.

In accordance with a fifth aspect of the present invention there is provided a method for transmitting data using a single carrier modulation, comprising a modulating step for organizing the data in blocks wherein each block is separated by a sequence of a predetermined signal.

In a further preferred embodiment, said sequence is a pseudo noise (PN) sequence. So, the transmitting comprises a modulation which organizes in a specific way the information, i.e. transmits blocks of signals separated by PN sequences of other signals which may be e.g. a repetition of symbol or a repetition of a sequence of symbols.

The above described objects and other aspects of the present invention will be better understood by the following description and the accompanying Figures.

Figure 2:
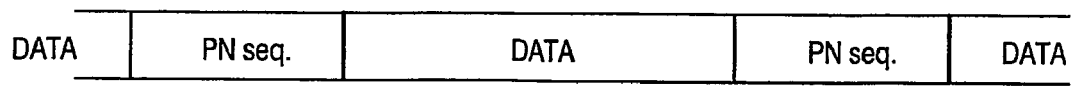

A preferred embodiment of the present invention is described with reference to the drawings in which:

FIG. 1 shows the physical layer of an overall transmission scheme of a communication system in block diagram;

FIG. 2 the modulator data format; and

Figure 3:
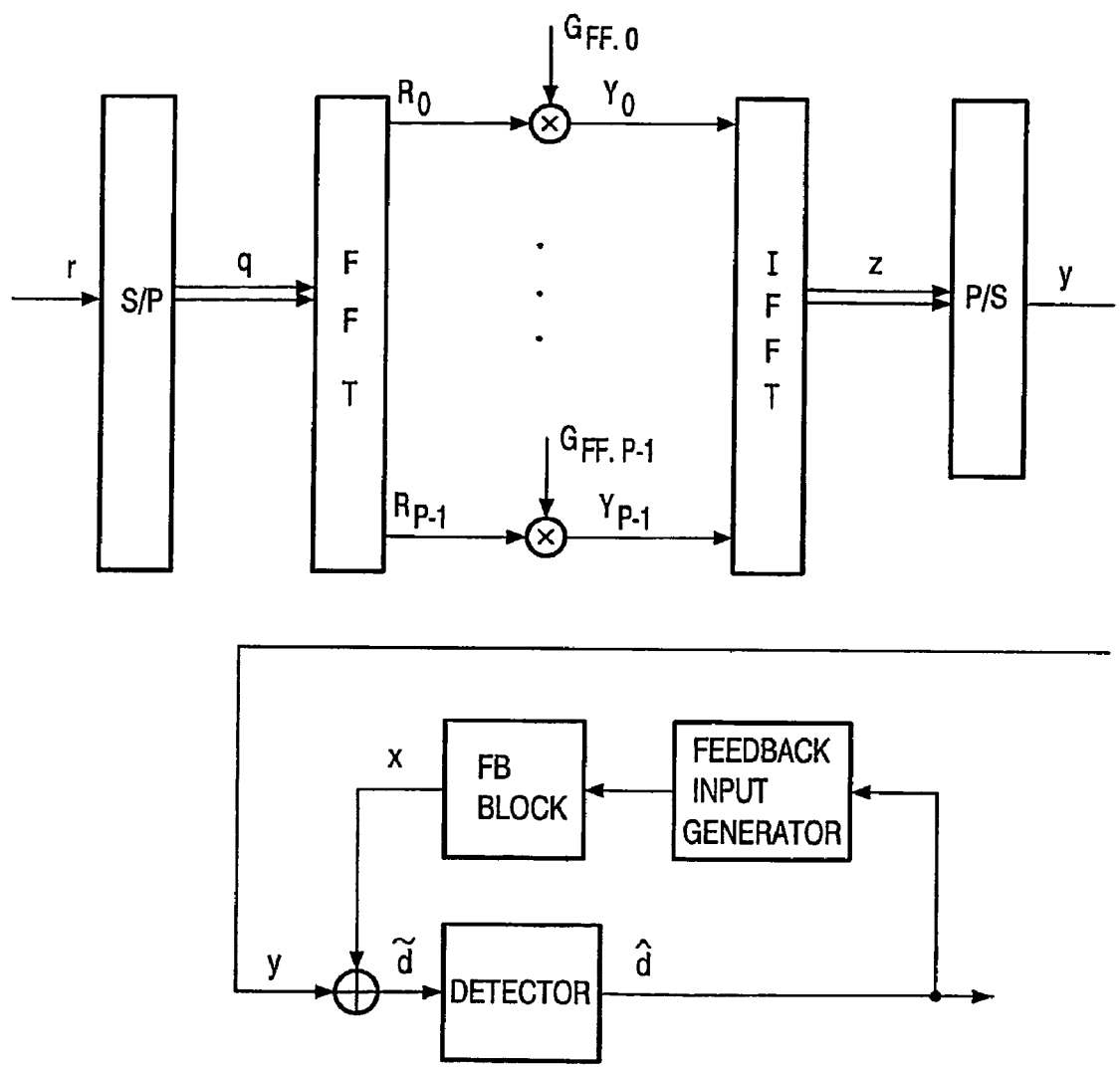

FIG. 3 a block diagram of the frequency-domain decision feedback equalizer provided in the system shown in FIG. 1.

Any communications system includes a physical layer. This layer conveys the bit stream (electrical impulse, light or radio signals) through a network at the electrical and mechanical level. It provides the hardware means of sending and receiving data on a carrier, including defining cables and physical aspects.

A typical operation of a physical layer is described hereinafter by referring to FIG. 1. At the transmitting side input bit data (IN) are first encoded to reduce the error probability and to obtain a signal e (block ENC.). Encoded bits e are mapped into complex symbols taken from a set which is named constellation (block MAP.). A stream of baseband discrete-time complex symbols d is obtained. The stream d is modulated to generate another discrete-time baseband complex signal by a modulator (block MOD.). The baseband signal is converted into an analog signal and, by front end, transmitted on the medium, (block FR. END. Tx).

At the receiving side a reverse operation is performed. A front end (block FR. END. Rx) converts the received continuous-time analog signal into a discrete-time complex baseband signal r. An equalizer is applied to generate a discrete-time signal $\hat{d}$ with symbols taken from a constellation (block EQUAL.). Demapping is performed to obtain a stream of bits ê (block DEMAP.). Decoding is then applied to obtain the output signal (block DEC.). Further blocks must be included at the receiving side, like a synchronization block (SYNC) and a channel estimation block (CH. EST) which recover information on the transmission medium.

In the following, the modulator (block MOD. in FIG. 1) at the transmitting side is described in greater detail.

The discrete-time signal d is inputted with a rate $1/T_d$. The discrete-time signal s is outputted with a rate $(M+L)/T_dM$, wherein M is the integer number of data symbol in each transmission block and L is an integer and defines the length of a pseudo noise (PN sequence) wherein L should be greater than the length of the channel impulse response.

As shown in FIG. 2, the input data stream is organized into blocks of M Adjacent symbols, and a PN sequence is added at the end of each block, thus obtaining blocks of size M+N which are sent to the output in sequence. At the beginning of the operation, an additional PN sequence is transmitted.

So, in the modulator, data symbols are organized in blocks and each block is separated by a fixed sequence of symbol, wherein this transmission format is denoted as PN-extension. After being formatted according to this rule, the symbols are transmitted.

The PN sequence can be also built with symbols not contained in the constellation, for example a sequence of zeros.

A further essential component is the frequency-domain decision feedback equalizer (block EQUAL. in FIG. 1) at the receiving side which is described hereinafter in greater detail by referring to FIG. 3.

In the equalizer, the discrete-time complex baseband signal r is processed to remove the interference due to the transmission channel. This is done by a two-block structure, including a filtering process operating efficiently with (inverse) fast Fourier transformation (I)FFT, a decision element and a filtering and cancellation processing.

As shown in FIG. 3, the signal r, which is a scalar signal and outputted from the receiver front end (block FR.END Rx in FIG. 1), is inputted into a serial to parallel converter (block S/P in FIG. 3). The S/P block generates blocks of P consecutive samples of the input signal with P=M+L. The output signal q is a vector signal which is inputted into a fast Fourier transformation block FFT. The FFT block performs the fast Fourier transformation on each input block. The output is a vector of signals $\{R_n\}$ with P components. Each signal $R_n$, n=0,1, . . . ,P-1 is multiplied by $G_{FF,n}$ so as to achieve a feed forward equalization. The result is a vector signal $\{Y_n\}$ with P components which is inputted into an inverse fast Fourier transformation block IFFT. In the IFFT block, an inverse fast Fourier transformation is applied to each block of the vector signal $\{Y_n\}$ to give a vector signal $\{Z_n\}$ with P components. This vector signal $\{Z_n\}$ is inputted into a parallel serial converter (block P/S in FIG. 3) which generates a scalar signal y which is constituted by consecutive blocks of M samples. Each block is built with M samples of each block of $\{Z_n\}$ with n=0,1, . . . ,M-1.

The equalizer further includes a detector (block DETECTOR in FIG. 3). The input to the detector is a discrete-time signal $\tilde{d}$, given by the sum of the output of the P/S block y and the output x of an FB block which is described in greater detail below. The output of the detector is a discrete time signal $\hat{d}$, whose samples are chosen from the constellation. The chosen constellation symbol has a minimum Euclidean distance from the corresponding input sample.

Further, there is provided a feedback input generator (block FEEDBACK INPUT GENERATOR in FIG. 3) which receives the scalar signal $\hat{d}$ and outputs a signal built by consecutive blocks, each including first the PN sequence and then M samples of the output of the detector.

The output signal from the feedback inputted generator is inputted into the FB block which outputs the scalar signal x. The FB block performs a linear filtering of the input signal, and the impulse response of the filtering is given by $\{g_{FB,n}\}$ By such filtering, the equalization is adapted to the particular transmission channel condition under which the transmission in performed.

The above described equalizer must be changed according to the particular conditions of the transmission medium. In particular, the front ends and the transmission medium can be modeled as cascade of a finite impulse response filter (the transmission filter) and additive Gaussian noise. Assuming that the transmission channel frequency response is known at the receiving side, the equalizer parameters are computed with the aim of a proper work of the equalizer and in particular minimizing the power of the noise plus distortion at the input of the detector (block DETECTOR in FIG. 3) as follows:

Parameters: M, L, P=M+L, $N_{FB}$.

Input: a sequence P complex samples $\{H_p\}$ which are the estimated P-points FFT of the channel impulse response.

Output: equalizer parameters $\{G_{FF,n}\}$ and $\{g_{FB,n}\}$.

Algorithm:

1. Let $g_{FB}=[g_{FB,1}, g_{FB,2}, \ldots g_{FB,N_{FB}}]^T$, (where $(\square)^T$ denotes the transpose).
2. Build the matrix (A) with entries $$[A]_{m,l} = \sum_{n=0}^{P-1} \frac{e^{-j2\pi \frac{n(l-m)}{P}}}{|H_n|^2}, \ 1 \le m, l \le N_{FB},$$

3. Build the column vector (b) with entries $$[b]_m = \sum_{n=0}^{P-1} \frac{e^{j2\pi \frac{nm}{P}}}{|H_n|^2}, \ 1 \le m \le N_{FB},$$

4. Solve the linear system of $N_{FB}$ equations with $N_{FB}$ unknowns $A\ g_{FB}=b$.
5. Compute the feedforward filter coefficients as follows:

$$G_{FF,n} = \frac{1}{H_n}\left(1 - \sum_{l=1}^{N_{FB}} g_{FB,l} e^{-j2\pi \frac{ln}{P}}\right), n = 0, 1, \ldots, P-1,$$

Other embodiments: If the signal to noise power ratio $\Gamma$ is known at the receiver, then $$[A]_{m,l} = \sum_{n=0}^{P-1} \frac{e^{-j2\pi \frac{n(l-m)}{P}}}{|H_n|^2 + \Gamma}, \ 1 \le m, l \le N_{FB}, \ \text{and}$$

$$[b]_m = \sum_{n=0}^{P-1} \frac{e^{j2\pi \frac{nm}{P}}}{|H_n|^2 + \Gamma}, \ 1 \le m \le N_{FB}.$$

The above described system can be applied to all broadband transmission systems; these include a wired transmission (all xDSL systems) and a wireless transmission (Hiperlan and IEEE802. 11 standard and DAB/DVB).

The mentioned system substitutes the OFDM modulator/demodulator and the equalizer. Transmission format must be changed from the cyclic-extended transmission to the PN-extended transmission.

In summary, the above described equalizer is an alternative in the systems where OFDM is used or has been proposed for application. The above described device is a physical layer component. In the ISO-OSI abstraction of a communication system, the medium access control (MAC) layer guarantees the quality of the transmission for example by error correcting codes. The above described device provides this MAC level with a stream of symbols having the same rate of an equivalent OFDM but with a bit error rate equal or even lower than OFDM. Furthermore, the above described system is more resilient to frequency offset phenomena and it requires a simpler power amplifier, since the peak to averaged power ratio is lower than OFDM. Moreover, when compared to single carrier equalizers it is both simpler and more efficient.

Although the invention is described above with reference to an example shown in the attached drawings, it is apparent that the invention is not restricted to it, but can vary in many ways within the scope disclosed in the attached claims.

The invention claimed is:

1. A frequency-domain decision feedback equalizer device for single carrier modulation comprising:
   a first section configured to generate an output signal and including
      a fast Fourier transformation circuit configured to perform a fast Fourier transformation on a first vector of signals inputted into said first section, and outputting a second vector of signals,
      a feed forward equalizer circuit configured and coupled to perform feed forward equalization by multiplying each of the components of said second vector of signals with equalization parameters, and outputting a third vector of signals, and
      an inverse fast Fourier transformation circuit configured and coupled to perform an inverse fast Fourier transformation on said third vector of signals, and outputting a fourth vector of signals; and
   a second section including
      a feedback filter circuit configured and coupled to perform linear filtering of a signal derived from an output signal of said second section,
      an adder circuit coupled to add the output signal of said feedback filter circuit to the output signal of said first section, and
      a detector circuit configured and coupled to receive the output signal of said adder circuit and generate said output signal of said second section by extracting samples from the output signal of said adding means.

2. The device according to claim 1, wherein said feed forward equalizer circuit generates equalization parameters adapted for minimizing the signal-to-noise ratio of the signal processed in the frequency-domain decision feedback equalizer device, preferably in the output signal of said first section.

3. The device according to claim 1, wherein said feed forward equalizer circuit generates equalization parameters by taking into account a fast Fourier transformation estimation of a channel impulse response of the signal processed in the frequency-domain decision feedback equalizer device, preferably in the output signal of said first section.

4. The device according to claim 1, wherein said first section further comprises:
   a serial to parallel converter circuit coupled to convert a sequence of signals input into said first section to said first vector of signals, and
   a parallel to serial converter circuit coupled to convert said fourth vector of signals to a sequence of output signals of said first section.

5. The device according to claim 4, wherein said serial to parallel converter circuit is adapted to receive scalar signals.

6. The device according to claim 4, wherein said serial to parallel converter circuit generates said first vector of signals including blocks of a predetermined number of consecutive samples of the signals input into said first section.

7. The device according to claim 4, wherein said parallel to serial converter circuit and said feedback filter means are configured to output scalar signals.

8. The device according to claim 6, wherein said parallel to serial converter circuit is configured to output a scalar signal which is constituted by consecutive blocks of a predetermined number of samples, each block being built with the predetermined number of samples of each block of said fourth vector of signals.

9. The device according to claim 1, wherein said detector circuit is configured to receive and output discrete time signals.

10. The device according to claim 1, wherein said detector circuit is configured to generate said output signal of the second section.

11. The device according to claim 1, wherein said second section further comprises a feedback input generator for receiving said output signal of said second section and providing an output signal which is built by consecutive blocks, each block including first a pseudo noise sequence and second a predetermined number (M) of samples from said output signal of said section, to said feedback filter circuit.

12. The device according to claim 1, further including a receiver of a communication system using a single carrier modulation, wherein said receiver includes said first and second sections of the frequency-domain decision feedback equalizer device.

13. The device according to claim 1, further including a communication system including a transmitter using a single carrier modulation, for transmitting data, comprising a modulator circuit configured to organize the data in blocks wherein each block is separated by a sequence of a predetermined signal and a receiver of a communication system using a single carrier modulation, wherein said receiver includes said first and second sections of the frequency-domain decision feedback equalizer device.

14. A frequency-domain decision feedback equalizing method for single carrier modulation, preferably for use in a broadband communication system, comprising the steps of:

in a first section providing an output signal of said first section by:
  performing a fast Fourier transformation on a first vector of signals inputted, and as a result providing a second vector of signals,
  performing a feed forward equalization by multiplying each of the components of said second vector of signals with equalization parameters, and as a result providing a third vector of signals,
  performing an inverse fast Fourier transformation on said third vector of signals, and as a result providing a fourth vector of signals, and
  providing an output signal of said first section on the basis of said fourth vector of signals; and in a second section:
  performing a linear feedback filtering of a signal derived from an output signal of said second section, and providing a filtered signal,
  adding said filtered signal to said output signal of said first section, and providing an added signal, and
  generating said output signal of said second section by extracting samples from said added signal.

15. The method according to claim 14, wherein in said feed forward equalization step equalization parameters are generated adapted for minimizing the signal-to-noise ratio of the signal processed, preferably in the output signal of said first section.

16. The method according to claim 14, wherein in said feed forward equalization step equalization parameters are generated by taking into account a fast Fourier transformation estimation of a channel impulse response of the signal processed, preferably in the output signal of said first section.

17. The method according to claim 14, comprising in said first section the further steps of:
  serial to parallel converting a sequence of signals inputted into said first section to said first vector of signals, and
  parallel to serial converting said fourth vector of signals to a sequence of output signals of said first section.

18. The method according to claim 17, wherein said serial to parallel converting step is provided to process scalar signals.

19. The method according to claim 17, wherein said serial to parallel converting step is provided to generate said first vector of signals including blocks of a predetermined number of consecutive samples of the signals inputted into said first section.

20. The method according to claim 17, wherein said parallel to serial converting step and said linear feedback filtering step are provided to output scalar signals.

21. The method according to claim 19, wherein said parallel to serial converting step is provided to output a scalar signal which is constituted by consecutive blocks of a predetermined number of samples, each block being built with the predetermined number of samples of each block of said fourth vector of signals.

22. The method according to claim 14, wherein said extracting step in said second section is adapted to process discrete time signals.

23. The method according to claim 14, wherein said extracting step in said second section is provided to generate said output signal.

24. The method according to claim 14, comprising in said second section a feedback input generating step for processing said output signal of said second section and providing an output signal which is built by consecutive blocks, each block including first a pseudo noise sequence and second a predetermined number of samples from said output signal of said section, to said feedback filter means.

25. A frequency-domain decision feedback equalizer device for single carrier modulation, the device comprising:
  a first section including
    a fast Fourier transformer to perform a fast Fourier transformation on a first vector of single carrier signals inputted into said first section, and to output the transformed signals as a second vector of signals,
    a feed forward equalizer to perform a feed forward equalization by generating equalization parameters using a fast Fourier transformation estimation of a channel impulse response of an output single carrier signal of said first section, multiplying each of the components of said second vector of signals with the generated equalization parameters to reduce the signal-noise ratio of the signals, and outputting the multiplied signals as a third vector of signals, and
    an inverse fast Fourier transformer to perform an inverse fast Fourier transformation on said third vector of signals, and to output the inversely transformed signals as a fourth vector of signals that is the output signal of the first section; and a second section including
- a feedback filter to linearly filter a signal derived from an output signal of said second section,
- an adder to add the output signal of said feedback filter to the output signal of said first section, and
- a detector to receive the output signal of said adder and generate said output signal of said second section by extracting samples from the output signal of said adder.

26. The device according to claim 11, wherein:
the detector circuit is configured to receive and output discrete time signals selected from a constellation consisting of a set of symbols; and
wherein the pseudo noise sequence is constructed from symbols selected from the constellation.

27. The device according to claim 11, wherein:
the detector circuit is configured to receive and output discrete time signals selected from a first constellation consisting of a set of symbols; and
wherein the pseudo noise sequence is a selected sequence constructed from symbols selected from a second constellation exclusive to the first constellation.

28. The device according to claim 11, wherein:
the detector circuit is configured to output scalar signals including a number of samples consisting of the predetermined number (M) of consecutive samples; and
the feedback input generator is configured to output the pseudo noise sequence appended to the scalar signal.

* * * * *